United States Patent [19]

Larson

[11] 4,448,372

[45] May 15, 1984

[54] AIRCRAFT VERTICAL FIN-FUSELAGE STRUCTURAL INTEGRATION SYSTEM

[75] Inventor: Robert J. Larson, Seattle, Wash.

[73] Assignee: The Boeing Company, Seattle, Wash.

[21] Appl. No.: 307,107

[22] Filed: Sep. 30, 1981
(Under 37 CFR 1.47)

[51] Int. Cl.³ ............................................. B64C 1/26
[52] U.S. Cl. ................................ 244/87; 244/117 R;
244/119; 244/131
[58] Field of Search .................... 244/87, 117 R, 119, 244/120, 131

[56] References Cited

U.S. PATENT DOCUMENTS 2,998,209 8/1961 Creasey et al. ........................ 244/87
3,109,614 11/1963 Steidl ..................................... 244/87
3,666,211 5/1972 Cathers et al. ....................... 244/120

*Primary Examiner*—Charles E. Frankfort

*Attorney, Agent, or Firm*—Bernard A. Donahue; Ronald E. Suter; Steven W. Weinrieb

[57] ABSTRACT

An aircraft vertical fin-fuselage structural integration system wherein a plurality of vertical tail fin spars, extending transversely across the fin and fuselage and substantially parallel to the longitudinal axis of the fin, are integrally connected directly to the fuselage pressure bulkhead so as to directly transmit or transfer the vertical fin and horizontal stabilizer empennage loads to the fuselage structural network. The system can be adapted to any type of aircraft, and in the case of an aircraft of the BOEING 727 class, the spars accommodate the air intake S-duct operatively associated with the craft's rear engine housed within the rearwardmost portion of the fuselage. The spars also have their lateral configurations fabricated so as to match the fuselage loft lines.

20 Claims, 3 Drawing Figures

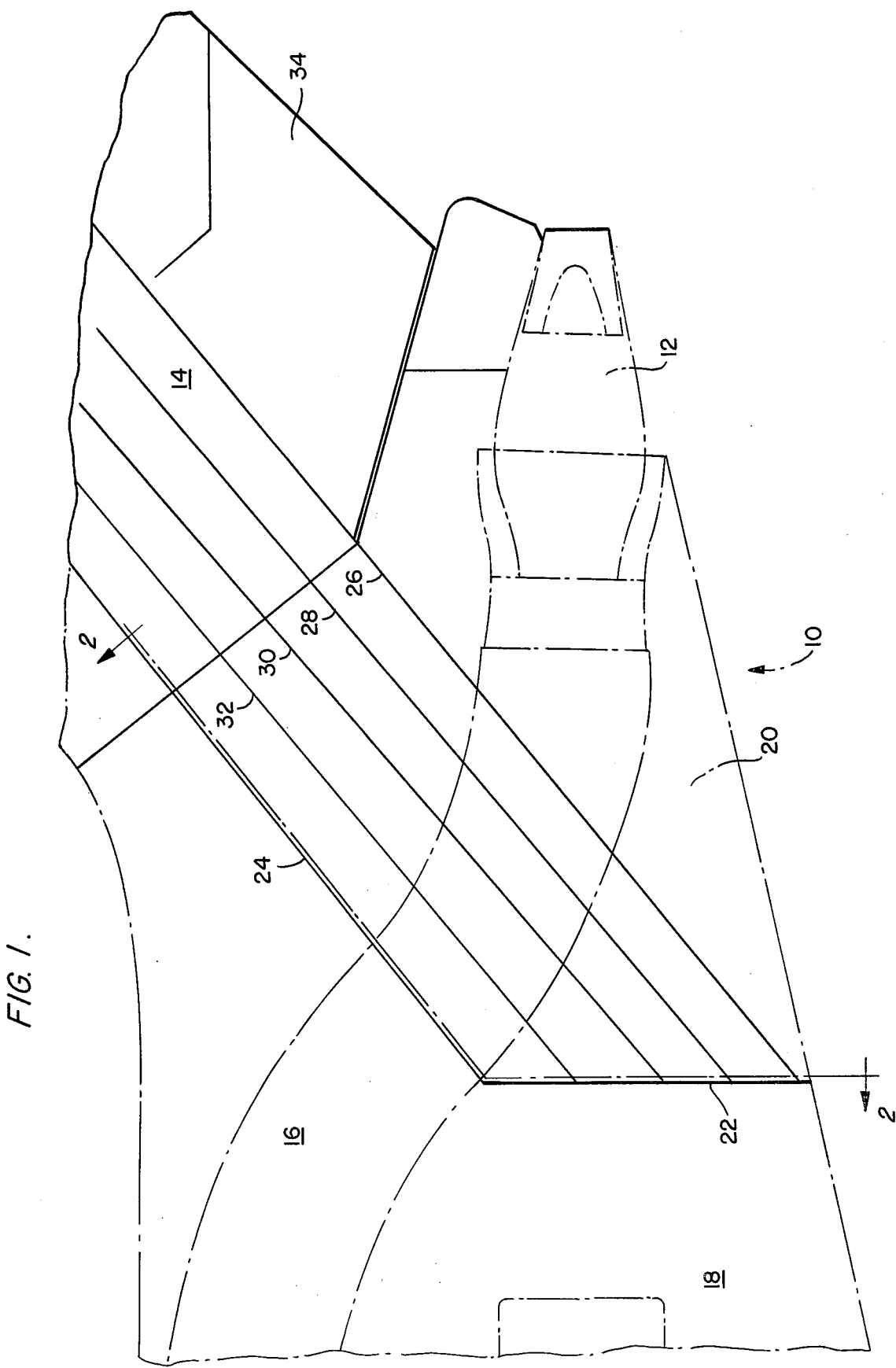
FIG. I.

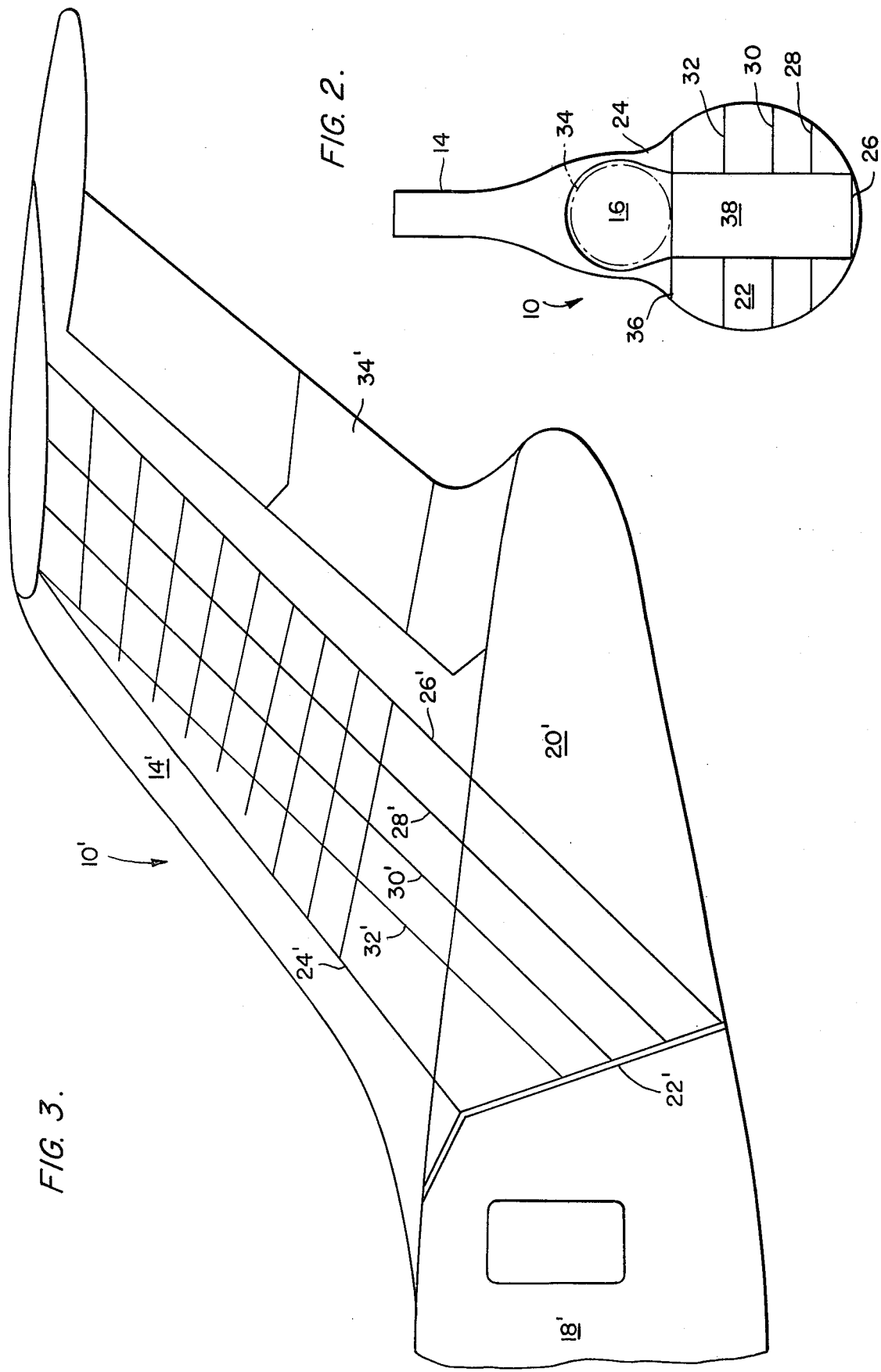

AIRCRAFT VERTICAL FIN-FUSELAGE STRUCTURAL INTEGRATION SYSTEM

FIELD OF THE INVENTION

The present invention relates generally to aircraft structures, and more particularly to an integrated structural system defined between the vertical tail fin of the aircraft and the aircraft's monocoque fuselage.

BACKGROUND OF THE INVENTION

Commencing within the time period extending from the last quarter of 1973 through at least the first quarter of 1974, the world, particularly the industrialized and energy-consuming nations, was suddenly made acutely aware of the existence of the Organization of Petroleum Exporting Countries, acronymously and subsequently infamously known as OPEC, which precipitated the first major energy crisis of modern times through means of a substantial curtailment of a large percentage of the world's crude oil supply output production as well as a several-fold increase in price of such crude oil. These factors, in turn, effectively increased the price of, for example, automotive gasoline, home heating oil, aircraft jet fuel, and all petroleum oil products in general, to a substantial degree. Consequently, this dominance and effective control of the world's crude oil supplies and pricing structure by OPEC underscored the need for the world's industrialized nations to economically develop other sources of energy, and for all nations of the world to conservatively use existing crude oil supplies and sources.

In the conservative energy use sphere, such as, for example, in connection with the automotive industry, various techniques have been employed to render the newest automobiles the most fuel-efficient. In addition to the manufacture of improved automotive engines and transmissions, for example, one mode or technique that has been successfully employed has been to structurally re-design the automobiles so as to provide the same with substantially the same passenger and cargo payload or accommodation volume while simultaneously reducing the overall size of the automobile. In addition, the newest automobiles are being fabricated from materials, in whole or in part, which provide favorable strength-to-weight characteristics as compared to previously conventional thick-gauge metal. These various design and material improvements have effectively reduced the overall weight of the automobiles which has led to a demonstrative improvement in the fuel efficiency of the automobiles as determined by the variously available automotive miles-per-gallon test data.

Similar improvements and technological advances have assuredly been achieved in the aircraft industry. In addition to vastly improved aircraft engines, the most recently produced fleets of aircraft have been fabricated with improved materials, such as, for example, aluminum, titanium, and the like, which have simultaneously reduced the gross weight of the aircraft and have permitted the same to fly with substantially improved, that is, reduced, fuel consumption.

Further improvements have yet to be made, however, in connection with the structural framework system of the aircraft, particularly those portions of the system which define the interconnections between the monocoque fuselage of the aircraft and the aircraft's wings, horizontal stabilizers, and the vertical tail fin. With respect to the structural integration system conventionally employed, for example, to interconnect the aircraft's vertical tail fin with the fuselage, the fin structure is attached to aft body structure which, in turn, is attached to the monocoque fuselage structure. In this manner, vertical fin and horizontal stabilizer loads are necessarily initially transferred or transmitted to the aft body structure and then secondarily transmitted or distributed by the aft body into the monocoque fuselage structure.

A need therefore exists for a structural re-designing of the empennage-fuselage structural integration system whereby the tail fin and horizontal stabilizer loads would be able to be transferred or transmitted directly into the fuselage structure. In this manner, the number of joints defined between the empennage and the fuselage may be substantially reduced as may the extent of the load paths. These factors will in turn lead to a substantial reduction in material and construction-assembly manufacturing costs as well as a significant decrease in the gross weight of the aircraft empennage assembly which will favorably affect operating costs.

OBJECTS OF THE INVENTION

Accordingly, it is an object of the present invention to provide a new and improved structural framework system for aircraft.

Another object of the present invention is to provide a new and improved aircraft structural framework system which is particularly adaptable for integrating and interconnecting the aircraft empennage and fuselage structures.

Still another object of the present invention is to provide a new and improved fuselage-vertical fin integrated structural system which will substantially simplify the transmission of loads from the aircraft empennage to the aircraft fuselage.

Yet another object of the present invention is to provide a new and improved fuselage-vertical fin integrated structural system which will facilitate the transmission of loads from the aircraft empennage directly to the aircraft fuselage.

Still yet another object of the present invention is to provide a new and improved fuselage-vertical fin integrated structural system which will facilitate the achievement of a substantial reduction in manufacturing costs attributable to the construction or assemblage of the fuselage-vertical fin portion of the aircraft.

Yet still another object of the present invention is to provide a new and improved fuselage-vertical fin integrated structural system which will substantially reduce the manufacturing costs of the fuselage-empennage system by materially reducing the number of structural components, and joints defined therebetween, comprising the fuselage-empennage system.

A further object of the present invention is to provide a new and improved fuselage-vertical fin integrated structural system which will substantially reduce the manufacturing costs of the fuselage-empennage system by appreciably reducing the amount of material required for the system due to the reduction in the number of structural components comprising the system as well as the configurational design efficiency of the structural components.

A still further object of the present invention is to provide a new and improved fuselage-vertical fin integrated structural system which exhibits substantially improved strength-to-weight characteristics as compared to conventional fuselage-empennage structural systems.

A yet further object of the present invention is to provide a new and improved fuselage-vertical fin integrated structural system which favorably affects the operating costs of the aircraft by appreciably reducing the gross weight of the fuselage-empennage system.

SUMMARY OF THE INVENTION

The foregoing and other objects of the present invention are achieved through the provision of an aircraft fuselage-vertical fin integrated structural system which includes a plurality of spars disposed in planes, as viewed in a cross-sectional view taken through the longitudinal axis of the aircraft fuselage and the vertical fin, which are substantially parallel to the longitudinal axis of the vertical fin. The aft pressure bulkhead of the aircraft fuselage is disposed substantially perpendicular to the longitudinal axis of the fuselage, and in view of the fact that the longitudinal axis of the vertical fin is disposed at an inclined angle extending upwardly and rearwardly relative to the fuselage axis, the vertical fin spars are similarly disposed with respect to the fuselage axis.

In accordance with the particular integrated structural system of the present invention, each of the vertical fin spars extends downwardly and forwardly such that the fuselage end of each spar extends into and is disposed within the fuselage framework. More importantly, the fuselage end of each vertical fin spar is secured directly to the aft fuselage pressure bulkhead which, due to the integrated interconnection system defined with the vertical fin spars, is able to be fabricated as a planar member as opposed to the conventional dome-shaped pressure bulkheads.

The integrated fuselage-vertical fin structural system of the present invention is applicable to all types of aircraft, for example, of the assignee company and as generally designated as 7×7 aircraft, and in accordance with a particularly unique feature of the present invention, the system of the present invention is capable of being readily adapted to accommodate the S-duct which is characteristic of the BOEING 727 aircraft wherein the S-duct extends from a position atop the fuselage just forward of the vertical fin, downwardly through the fuselage, and terminates at the rearwardmost position of the fuselage below the vertical fin. In particular, the spars of the vertical fin system of the present invention are especially configured so as to accommodate the S-duct passing therethrough, and which thereby surround the S-duct at various axial positions taken along the fuselage axis. In addition, the lateral extreme edges of each vertical fin spar are configured so as to match the fuselage loft lines.

BRIEF DESCRIPTION OF THE DRAWINGS

Various other objects, features, and attendant advantages of the present invention will be more fully appreciated as the same becomes better understood from the following detailed description when considered in conjunction with the accompanying drawings, in which like reference characters designate like or corresponding parts throughout the several views, and wherein:

FIG. 1, is a cross-sectional view taken along the central longitudinal axis of an aircraft within which the improved integrated structural system of the present invention has been employed;

FIG. 2 is a cross-sectional view of the aircraft shown in FIG. 1 and taken along the lines 2—2 of FIG. 1; and FIG. 3 is a view similar to that of FIG. 1 showing, however, the employment of the improved integrated structural system of the present invention within a different type of aircraft, that is, one within which there is not provided the rear-engine S-duct assembly.

DETAILED DESCRIPTION OF THE ILLUSTRATED EMBODIMENTS

Referring now to the drawings, and more particularly to FIG. 1 thereof, there is disclosed an aircraft of the BOEING 727 class, and generally indicated by the reference character 10. As is well-known, this type of aircraft is provided with three aircraft engines, two of which, not shown, are disposed exteriorly of the aircraft fuselage upon opposite sides thereof and within the vicinity of the horizontal stabilizers. The third engine 12 is disposed within the rearwardmost portion of the fuselage and is disposed beneath the vertical tail fin 14. In order to provide intake air to the engine 12, the aircraft is provided with an S-shaped duct 16, the inlet or forward end thereof being disposed atop the fuselage 18 while the rearward terminal or output end of the duct fluidically communicates with the engine inlet. The intermediate and rearward portions of the S-duct 16 are thus seen to pass through the aft body portion 20 of the fuselage 18 which is defined as that portion of the fuselage disposed aft of the pressure bulkhead 22.

The vertical tail fin 14 of the aircraft is normally provided with a front spar 24, a rear spar 26, and a plurality of intermediate or mid-spars 28, 30, and 32. The aircraft rudder 34 is of course disposed rearwardly of the rear spar 26. In accordance with conventional integrated structural systems defined between the vertical tail fin 14 and the fuselage 18, the lower ends of the spars 24-32 would all terminate in a substantially horizontal plane which was defined by means of the intersection of the vertical tail fin 14 with the fuselage aft body 20 at the uppermost portion of the aft body, such horizontal plane therefore being substantially parallel to the longitudinal axis of the fuselage. In this manner, vertical fin and horizontal stabilizer loads are necessarily initially transferred or transmitted to the fuselage aft body structure 20 and then secondarily transmitted or distributed by the aft body 20 into the monocoque fuselage structure 18. This system therefore requires a substantial number of structural components in order to properly and adequately accommodate the various load paths. Such a system, with its substantial number of structural load components serves to add to the manufacturing costs of the aircraft in view of the material and processing costs in fabricating the various structural components as well as the construction costs involved in assembling the system together by, for example, conventional welding techniques or the like. The utilization of these numerous load-carrying structural components also renders the gross weight of this section of the aircraft substantially high which, in turn, adversely affects the operating costs of the aircraft in terms of fuel efficiency.

In accordance with the improved aircraft fuselage-vertical tail fin integrated structural system of the present invention, the vertical tail fin structure 14 is directly attached to and integrated with the fuselage structural framework 18 thereby, in effect, by-passing the structural framework comprising the fuselage aft body 20. In this manner, the load paths are more direct as defined between the vertical tail fin 14 and the fuselage 18 with a concomitant reduction in structural load-bearing members and their requisite manufacturing and assemblage costs.

Referring again, therefore, to FIG. 1, it is seen that the spars 24-32 of the vertical tail fin 14 are all disposed substantially parallel with respect to what can be appreciated to be the longitudinal axis, not shown, of the fin 14. Furthermore, in view of the fact that the longitudinal axis, not shown, of the vertical tail fin 14 is disposed at an inclined angle extending upwardly and rearwardly relative to the fuselage axis, also not shown, the vertical tail fin spars 24-32 are similarly disposed with respect to the fuselage axis. Considered from a different point of reference, the vertical tail fin spars 24-32 can also be considered to extend downwardly and forwardly within the same inclined angular planes, and it is seen that in accordance with the present invention, the forwardmost end of each of the spars 24-32 is directly integrated to the fuselage pressure bulkhead 22 which extends substantially perpendicular to the fuselage axis, not shown.

It is to be noted at this juncture that the integrated structural system of the present invention also achieves further structural efficiency, reduced gross weight for the aircraft, and reduced manufacturing costs for reasons beyond those already stated. Due to the typical pressure profiles normally encountered within conventional aircraft structures, as well as in view of structural strength and fatigue considerations, it is well known that pressure bulkheads similar to that shown at 22 in FIG. 1 conventionally have a dome-shaped configuration with the apex of the dome extending rearwardly or toward the rear portion of the aircraft such that the same would appear concave as viewed from the pressurized fuselage and convex as viewed from the fuselage aft body. The bulkhead 22 of the present invention, however, is seen to be planar in view of the fact that the integration defined between the bulkhead and the vertical tail fin spars 24-32 permit the spars to impart sufficient stiffening forces and support to the bulkhead 22 that the dome-shaped configuration is no longer necessary. As can therefore be appreciated, as the material surface area and volume normally encompassed by the dome-configured bulkhead is now drastically reduced to a simple planar plate or structure, material costs involved in fabricating the bulkhead are appreciably reduced. In addition, the fabrication techniques involved in the fabrication of a dome-shaped bulkhead are more complex than those required for the manufacture of a planar bulkhead and, consequently, the tooling manufacturing costs are accordingly reduced. Still further, the fabrication of the planar bulkhead from the considerably reduced volume of material, as compared to that required for the production of a dome-shaped bulkhead, decreases the gross weight of the aircraft which, in turn, permits the aircraft to be operated with greater fuel efficiency and economy.

As noted hereinabove, the vertical tail fin spars 24-32 pass through the fuselage aft body framework 20 without being integrated into the structural system defining the aft body 20 and therefore effectively by-passing the same. In a similar manner, the S-duct 16 of the aircraft likewise passes through the aft body framework 20 as the duct serves to fluidically connect the intake end of the duct with the intake end of the engine 12. It will be seen from FIG. 1 that the duct 16 and the spars 24-32 extend in substantially opposite directions, that is, the duct passes through the aft body 20 in a substantially downwardly and rearwardly orientation while the spars 24-32 pass through the aft body 20 in a generally downwardly and forwardly direction. In view of the fact that the spars 24-32 extend laterally throughout the entire breadth of the vertical tail fin 14 as well as that of the fuselage 18 and aft body 20, the spars must structurally accommodate the S-duct 16 so as not to in fact interfere with its disposition within the fuselage as well as its air communication function.

Accordingly, as best seen in FIG. 2 as appreciated in conjunction with FIG. 1, each of the spars will be provided with a suitable aperture defined therethrough for accommodating the S-duct 16. Due to the particular cross-sectional reference plane defining FIG. 2 relative to FIG. 1, only an aperture 34 is illustrated as being defined within front spar 24, however, as may be appreciated from FIGS. 1 and 2 considered together, similar aperture defining means are provided within each of the other spars 26-32 at the appropriate axial locations within the fuselage aft body 20 so as to in fact appropriately accommodate the S-duct 16. It will also be appreciated that the outer lateral contours of each of the spars 24-32 is appropriately configured so as to match the fuselage loft lines as shown, for example, at 36 with respect to front spar 24. Disclosed at 38, for illustrative continuity primarily and not with respect to any purpose of including the same herein as being part of the present invention, is an auxiliary power unit (APU) housing or cavity which borders upon, at one end thereof, the bulkhead 22, the remainder of the housing or cavity extending rearwardly into the aft body structure 20. As can therefore be appreciated further from FIG. 2, each of the spars 24-32 must structurally accommodate the housing 38 in a manner similar to the accommodation of the engine S-duct 16.

Referring lastly to FIG. 3, there is illustrated another embodiment of the present invention wherein like reference characters designate like or corresponding parts, except that the similar structural components of the embodiment of FIG. 3, which correspond to those components of the embodiment of FIGURE 1, have a (') associated therewith. In accordance with this embodiment of the present invention, the particular aircraft is not of the BOEING 727 class and does not have a rear engine 12 or an air intake S-duct 16 incorporated into the structure thereof. Otherwise, the principles of the invention embodied within the aircraft 10' are substantially the same as those principles of the invention as embodied within the aircraft 10 of FIG. 1.

Thus it may be seen that the integrated structural system of the present invention has distinct advantages over conventional structural systems. More particularly, in view of the direct integrated structural system as defined between the vertical tail fin spars and the aircraft fuselage pressure bulkhead, vertical fin and horizontal stabilizer empennage loads are capable of being directly transmitted to the fuselage structural framework without the loads being initially transferred or transmitted to the intermediary fuselage aft body structure. The structural interplay as defined between the vertical fin spars and the fuselage pressure bulkhead permits a simpler bulkhead to be fabricated which, in turn, contributes to a material reduction in materials costs, construction or assemblage costs, and the gross weight of the structural components, and ultimately of the aircraft. Greater operating expenditure efficiency also results from the improved integrated structural system of the present invention due to diminished fuel costs as influenced by the improved strength-to-weight ratio characteristics of the aircraft as determined by the structural efficiency of the aircraft.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An aircraft vertical fin-fuselage structural integration system, comprising:
   fuselage means;
   single pressure bulkhead means disposed within said fuselage means:
   vertical tail fin means disposed atop the rear portion of said fuselage means; and
   a plurality of structural spars disposed within said vertical tail fin means,
   all of said vertical tail fin structural spars being directly connected to said single fuselage pressure bulkhead means.

2. The structural integration system as set forth in claim 1, wherein:
   said fuselage pressure bulkhead means comprises a planar structural plate.

3. The structural integration system as set forth in claim 2, wherein:
   said fuselage pressure bulkhead means is disposed substantially perpendicular to the longitudinal axis of said fuselage means.

4. The structural integration system as set forth in claim 1, wherein:
   the longitudinal axis of said vertical tail fin means is disposed at an angle with respect to the longitudinal axis of said fuselage means such that said vertical tail fin means axis extends upwardly and rearwardly from said fuselage means axis; and
   all of said vertical tail fin spars are disposed substantially parallel to said longitudinal axis of said vertical tail fin means.

5. The structural integration system as set forth in claim 1, wherein:
   the outer lateral contours of each of said vertical tail fin spars has a configuration which substantially matches that of said fuselage means.

6. The structural integration system as set forth in claim 1, further comprising:
   engine means disposed within the rearwardmost portion of said fuselage means;
   S-shaped duct means disposed within said fuselage means for providing intake air to said engine means; and
   means defined within said plurality of structural spars of said vertical tail fin means for accommodating said S-shaped duct means such that said S-shaped duct means can pass through each of said spars.

7. An aircraft vertical fin-fuselage structural integration system, comprising:
   fuselage means;
   a pressure bulkhead disposed between a pressurized section of said fuselage means and an aft body section of said fuselage means;
   vertical tail fin means disposed atop the rear portion of said fuselage means; and
   a plurality of structural spars disposed within said vertical tail fin means,
   all of said vertical tail fin structural spars being directly connected to said pressure bulkhead.

8. The structural integration system as set forth in claim 7, wherein:
   said plurality of spars are connected to said pressure bulkhead in a substantially vertically spaced array.

9. The structural integration system as set forth in claim 7, wherein:
   said plurality of spars are connected to said pressure bulkhead in a substantially vertically disposed planar array.

10. The structural integration system as set forth in claim 9, wherein:
    said pressure bulkhead comprises a planar structural plate.

11. The structural integration system as set forth in claim 7, wherein:
    said pressure bulkhead is disposed substantially perpendicular to the longitudinal axis of said fuselage means.

12. The structural integration system as set forth in claim 7, wherein:
    the longitudinal axis of said vertical tail fin means is disposed at an angle with respect to the longitudinal axis of said fuselage means such that said vertical tail fin means axis extends upwardly and rearwardly from said fuselage means axis; and
    all of said vertical tail fin spars are disposed substantially parallel to said longitudinal axis of said vertical tail fin means.

13. The structural integration system as set forth in claim 7, wherein:
    the outer lateral contours of each of said vertical tail fin spars has a configuration which substantially corresponds to that of said fuselage means.

14. The structural integration system as set forth in claim 7, and further comprising:
    engine means disposed within said aft body section of said fuselage means;
    S-shaped duct means disposed within said fuselage means for providing intake air to said engine means; and
    means defined within said plurality of structural spars of said vertical tail fin means for accommodating said S-shaped duct means such that said S-shaped duct means can pass through each of said spars.

15. An aircraft vertical fin-fuselage structural integration system, comprising:
    fuselage means;
    a pressure bulkhead disposed between a pressurized section of said fuselage means and an aft body section of said fuselage means;
    vertical tail fin means disposed atop the rear portion of said fuselage means; and
    a plurality of structural spars disposed within said vertical tail fin means,
    all of said vertical tail fin structural spars being directly connected to said pressure bulkhead so as to transmit load forces directly from the empennage means of said aircraft including said vertical tail fin means to said fuselage means including said pressure bulkhead.

16. The structural integration system as set forth in claim 15, wherein:
    said plurality of spars are connected to said pressure bulkhead in a substantially vertically spaced array.

17. The structural integration system as set forth in claim 15, wherein:
said plurality of spars are connected to said pressure bulkhead in an array extending across the surface of said pressure bulkhead so as to structurally reinforce said pressure bulkhead.

18. The structural integration system as set forth in claim 15, wherein:
said pressure bulkhead comprises a planar structural plate.

19. The structural integration system as set forth in claim 15, wherein:
said plurality of spars are connected to said pressure bulkhead in a substantially vertically disposed planar array.

20. The structural integration system as set forth in claim 15, wherein:
said pressure bulkhead is disposed substantially perpendicular to the longitudinal axis of said fuselage means.

* * * * *